(12) United States Patent
Zhan et al.

(10) Patent No.: US 9,946,048 B2
(45) Date of Patent: Apr. 17, 2018

(54) LENS BARREL MODULE AND LENS ASSEMBLY INCLUDING THE SAME

(71) Applicant: Genius Electronic Optical Co., Ltd., Taichung (TW)

(72) Inventors: Haibin Zhan, Fujian (CN); Hung-Chang Cho, Taichung (TW); Weiwei Fu, Fujian (CN); Zhenmu Chen, Fujian (CN); Weimin Li, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 93 days.

(21) Appl. No.: 14/849,876

(22) Filed: Sep. 10, 2015

(65) Prior Publication Data
US 2017/0003473 A1   Jan. 5, 2017

(30) Foreign Application Priority Data

Jul. 3, 2015   (CN) .......................... 2015 1 0386503

(51) Int. Cl.
*G02B 7/02* (2006.01)
*G02B 5/00* (2006.01)
G02B 13/00 (2006.01)

(52) U.S. Cl.
CPC ............. *G02B 7/025* (2013.01); *G02B 5/005* (2013.01); *G02B 7/021* (2013.01); *G02B 7/022* (2013.01); *G02B 13/004* (2013.01)

(58) Field of Classification Search
CPC .......... G02B 7/025; G02B 7/021; G02B 7/02; G02B 5/005; G02B 7/022; G02B 13/004

USPC .................................................. 359/818–824
See application file for complete search history.

(56) References Cited

U.S. PATENT DOCUMENTS

| 2005/0007680 A1* | 1/2005 | Naganuma | B82Y 20/00 359/704 |
| 2011/0069198 A1* | 3/2011 | Ezawa | G02B 7/021 348/222.1 |
| 2011/0304914 A1* | 12/2011 | Gutierrez | G02B 7/102 359/554 |

(Continued)

FOREIGN PATENT DOCUMENTS

| TW | I421554 | 1/2014 |
| TW | I453494 | 9/2014 |

OTHER PUBLICATIONS

"Office Action of Taiwan Counterpart Application", dated Sep. 6, 2016, p. 1-p. 6.

*Primary Examiner* — Ricky Mack
*Assistant Examiner* — Daniele Manikeu
(74) *Attorney, Agent, or Firm* — JCIPRNET

(57) ABSTRACT

A lens barrel module is disclosed to include a lens barrel unit and a flow path unit. The lens barrel unit extends along an axis and includes a peripheral wall that surrounds the axis and that has a first end adjacent to an object side of a lens assembly and a second end opposite to the first end and adjacent to an image side of the lens assembly. The peripheral wall defines an accommodation space configured as a series of accommodation sections for receiving the optical members. The flow path unit is formed in the lens barrel module and is in spatial communication with at least two of the accommodation sections. A lens assembly including the lens barrel module is also disclosed.

8 Claims, 10 Drawing Sheets

(56) References Cited

U.S. PATENT DOCUMENTS

2012/0105983 A1* 5/2012 Huang .................. G02B 7/026
                                            359/819
2014/0362459 A1* 12/2014 Tohjima .................. G02B 7/04
                                            359/825
2015/0015954 A1* 1/2015 Baik ........................ G02B 7/08
                                            359/507
2015/0316742 A1* 11/2015 Jono .................. A61B 1/00096
                                            348/76

* cited by examiner

US 9,946,048 B2

LENS BARREL MODULE AND LENS ASSEMBLY INCLUDING THE SAME

CROSS-REFERENCE TO RELATED APPLICATION

This application claims priority of Chinese Patent Application No. 201510386503.1, filed on Jul. 3, 2015.

FIELD

The disclosure relates to a lens barrel module, and more particularly to a lens barrel module with an adhesive flow path. The disclosure also relates to a lens assembly including the lens barrel module with the adhesive flow path.

BACKGROUND

Referring to FIG. 1, a conventional lens assembly includes a lens barrel 4 and a plurality of optical members 5. The lens barrel 4 extends along an axis (B) includes a peripheral wall 41 that surrounds the axis (B), and has a first end 42 that is adjacent to an object side of the conventional lens assembly and a second end 43 that is opposite to the first end 42 and adjacent to an image side of the conventional lens assembly. The peripheral wall 41 defines an accommodation space 411 that is configured as a series of accommodation sections 44. The accommodation sections 44 have circular sectional dimensions, which are defined by the peripheral wall 41, and which gradually increase from the first end 42 to the second end 43 of the peripheral wall 41, and respectively serve to receive the optical members 5. The optical members 5 include a plurality of lenses 51 and at least one retaining member 52. Referring to FIG. 2, in another conventional lens assembly, the optical members 5 include a plurality of lenses 51 and at least one spacing member 53. For the abovementioned conventional lens assemblies, the optical members 5 have to be disposed in the accommodation space 411 sequentially from the first end 42 to the second end 43, and adhesive-dispensing and photo-curing steps have to be performed after each of the optical members 5 is disposed in the accommodation space 411. Hence, the assembly procedure of the conventional lens assemblies is complicated and time-consuming.

SUMMARY

Therefore, an object of the disclosure is to provide a lens barrel module and a lens assembly that can alleviate at least one of the drawbacks of the prior arts.

According to one aspect of the disclosure, a lens barrel module, which is adapted to receive a plurality of optical members of a lens assembly, includes a lens barrel unit and a flow path unit.

The lens barrel unit extends along an axis and includes a peripheral wall that surrounds the axis and that has a first end adjacent to an object side of the lens assembly and a second end opposite to the first end and adjacent to an image side of the lens assembly. The peripheral wall defines an accommodation space that is configured as a series of accommodation sections arranged along the axis for receiving the optical members.

The flow path unit is formed in the lens barrel unit and is in spatial communication with at least two of the accommodation sections.

According to another aspect of the disclosure, a lens assembly includes a lens barrel module, a plurality of optical members and an adhesive element.

The lens barrel module includes a lens barrel unit and a flow path unit.

The lens barrel unit extends along an axis and includes a peripheral wall that surrounds the axis and that has a first end adjacent to an object side of the lens assembly and a second end opposite to the first end and adjacent to an image side of the lens assembly. The peripheral wall defines an accommodation space that is configured as a series of accommodation sections arranged along the axis for receiving the optical members.

The flow path unit is formed in the lens barrel module and is in spatial communication with at least two of the accommodation sections.

The optical members are disposed in the accommodation sections of the accommodation space.

The adhesive element fills the flow path unit and makes the lens barrel module and the optical members bonded together.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
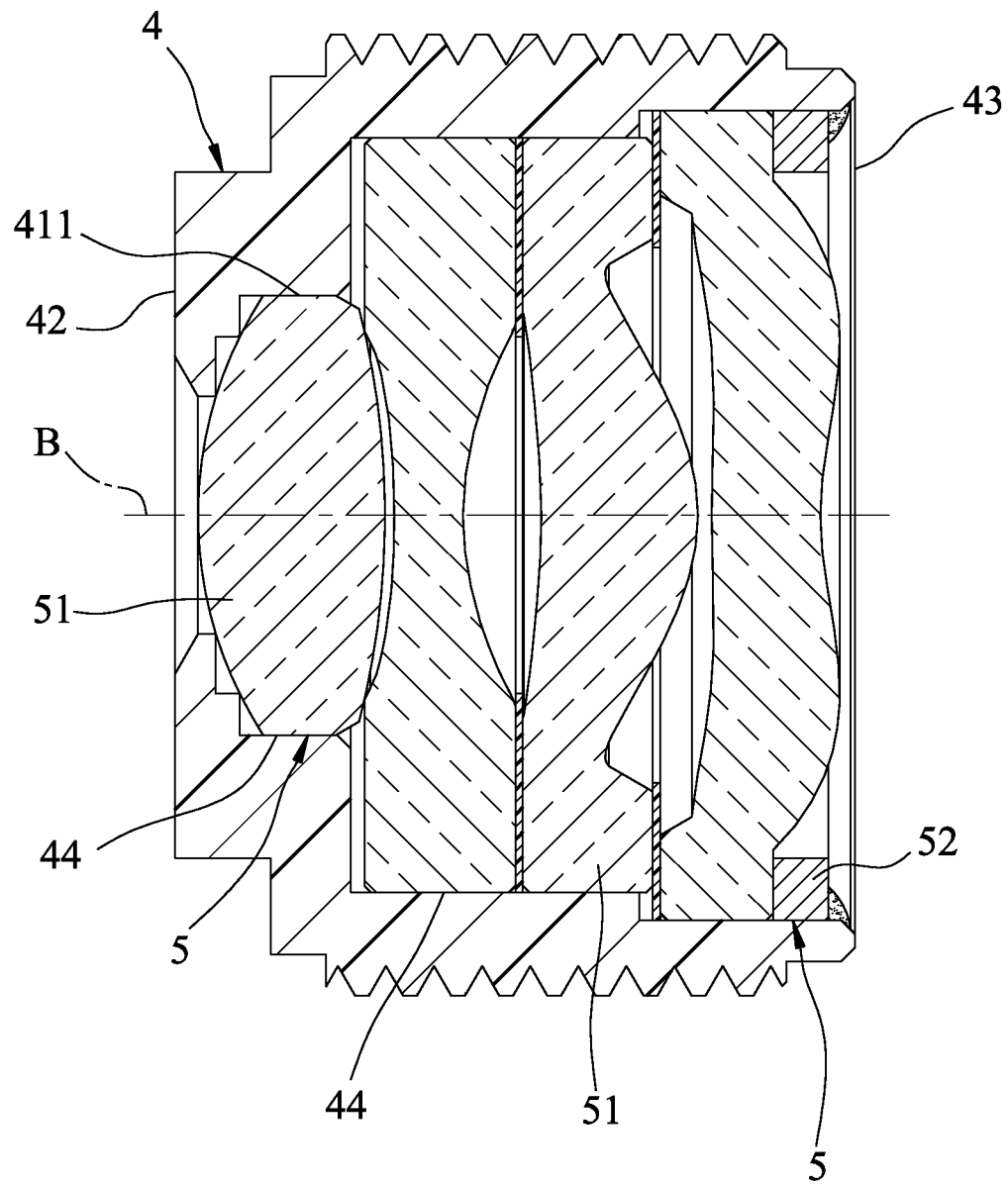
FIG. 1 is a sectional view of one type of conventional lens assembly.
Figure 2:
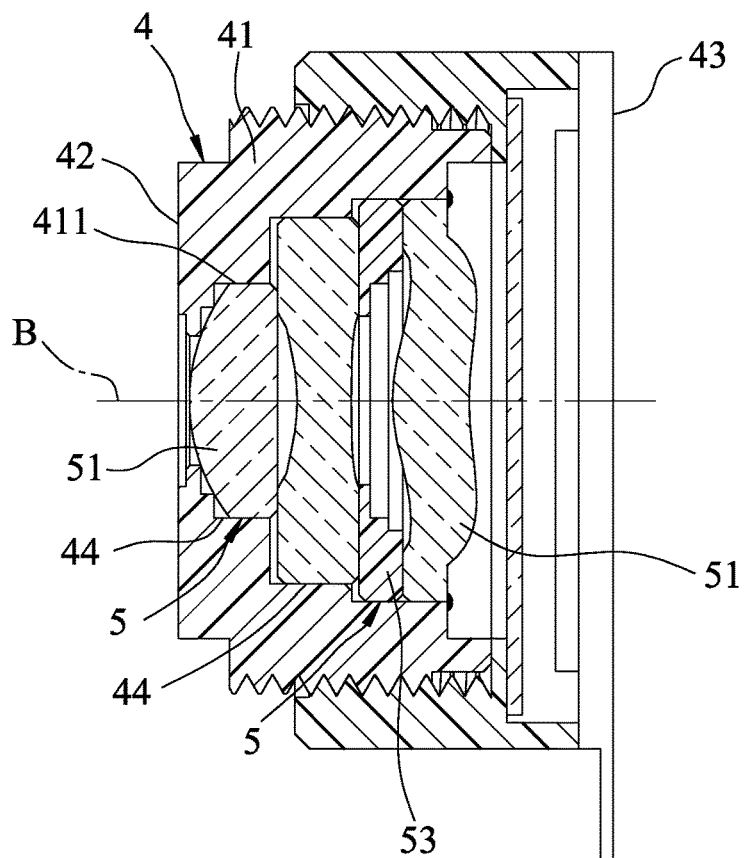
FIG. 2 is a sectional view of another type of conventional lens assembly.

Before the disclosure is described in greater detail, it should be noted that like elements are denoted by the same reference numerals throughout the disclosure.

Figure 3:
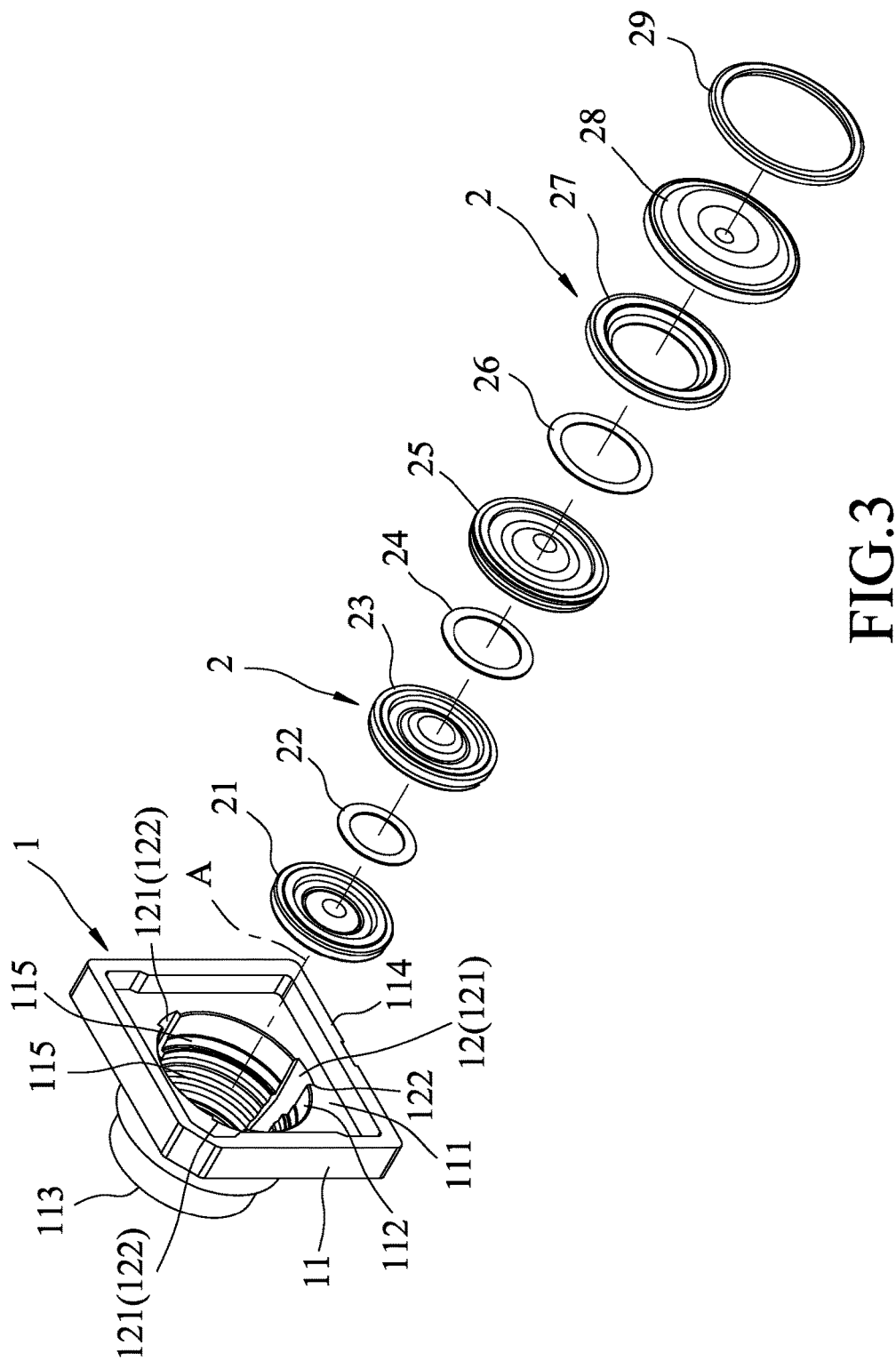
FIG. 3 is an exploded perspective view for illustrating the first embodiment of a lens assembly according to the disclosure.
Figure 4:
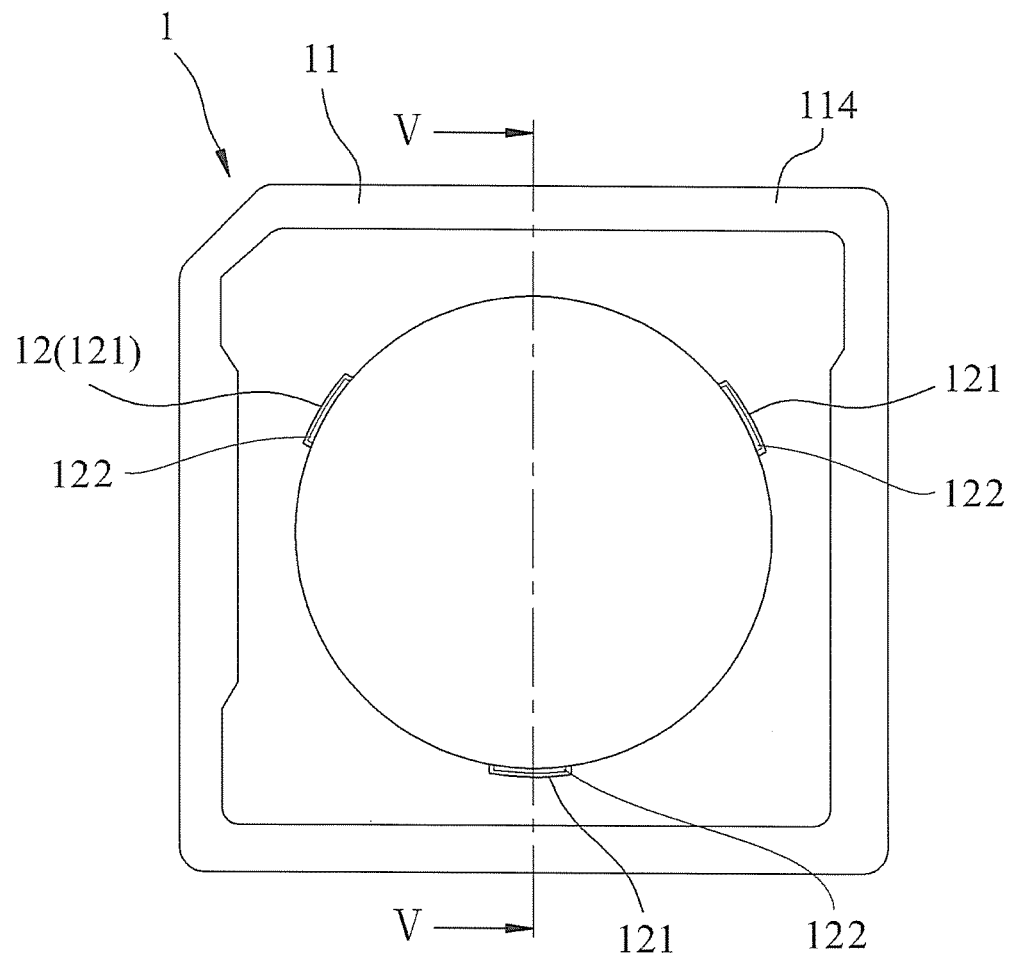
FIG. 4 is a top schematic view of the first embodiment.
Figure 5:
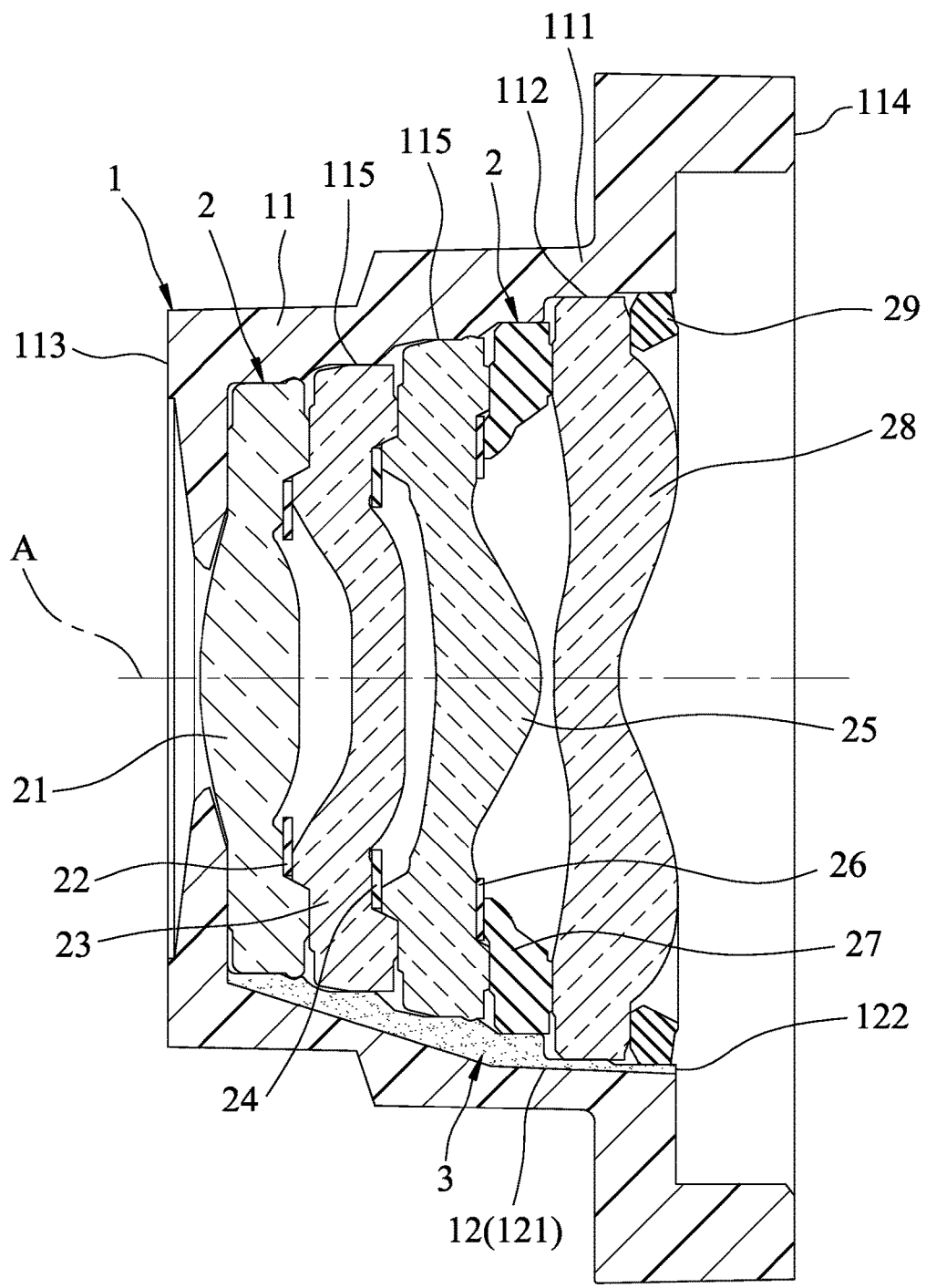
FIG. 5 is a sectional view taken along a line V-V shown in FIG. 4.

Referring to FIGS. 3 to 5, the first embodiment of a lens assembly according to the disclosure includes a lens barrel module 1, a plurality of optical members 2 and an adhesive element 3.

The lens barrel module 1 includes a lens barrel unit 11 and a flow path unit 12.

The lens barrel unit 11 extends along an axis (A) and includes a peripheral wall 111 that surrounds the axis (A) and that has a first end 113 adjacent to an object side of the lens assembly and a second end 114 opposite to the first end 113 and adjacent to an image side of the lens assembly. The peripheral wall 111 defines an accommodation space 112 that is configured as a series of accommodation sections 115 arranged along the axis (A). Among the accommodation sections 115, one of the accommodation sections 115 that is most adjacent to the first end 113 has a sectional dimension not greater than another of the accommodation sections 115 that is most adjacent to the second end 114. In this embodiment, the accommodation sections 115 have circular sectional dimensions, which are defined by the peripheral wall 111, and which gradually increase from the first end 113 to the second end 114 of the peripheral wall 111.

The flow path unit 12 is in spatial communication with at least two of the accommodation sections 115, and is formed with at least one flow path 121 that is dented in the peripheral wall 111. In this embodiment, the flow path unit 12 is formed with three separate flow paths 121. Each of the flow paths 121 has an opening 122 proximate to the second end 114.

The optical members 2 are disposed in the accommodation space 112. In this embodiment, the optical members 2 include a first optical lens 21, a first light-shielding member 22, a second optical lens 23, a second light-shielding member 24, a third optical lens 25, a third light-shielding member 26, a spacing member 27, a fourth optical lens 28 and a retaining member 29 disposed in the given order from the first end 113 to the second end 114 of the peripheral wall 111. The first optical lens 21, the second optical lens 23, the third optical lens 25, the spacing member 27, the fourth optical lens 28 and the retaining member 29 are respectively disposed in the accommodation sections 115, while the first light-shielding member 22, the second light-shielding member 24 and the third light-shielding member 26 are respectively interposed between and enclosed by the first and second optical lenses 21, 23, the second and third optical lenses 23, 25, and the third optical lens 25 and the spacing member 27.

The adhesive element 3 fills the flow path unit 12 and makes the lens barrel module 1 and the optical members 2 bonded together.

During assembly of the lens assembly, the optical members 2 are first sequentially disposed in the accommodation space 112 in the abovementioned order from the first end 113 to the second end 114 of the peripheral wall 111. Then, an adhesive is dispensed to the flow paths 121 through the openings 122, followed by being photocured so as to form the adhesive element 3. By way of the structural arrangement of the lens assembly of the disclosure, multiple cycles of adhesive-dispensing and photocuring operations respectively performed after individual placements of the optical members 2 are replaced with one cycle of adhesive-dispensing and photocuring operations performed after placement of all the optical members 2. The time required for assembling the lens assembly is greatly reduced and the assembling efficiency is enhanced.

When the disclosure is brought into practice, if the design of the lens assembly objectively cannot have the optimum structural arrangement, the one cycle of adhesive-dispensing and photocuring operations performed after placement of all the optical members 2 may result in insufficient curing of a portion of the adhesive that is adjacent to the first end 113, such as nearby the lens members 21, 23 for being much further from a UV light source used for photocuring. Placement of the optical members 2 may be conducted in batches and more than one cycle of adhesive-dispensing and photocuring operations are separately performed among the batches. For example, the first lens 21, the first light-shielding member 22 and the second optical lens 23 are first disposed in the corresponding accommodation sections 115, followed by the first cycle of adhesive-dispensing and photocuring operations. Then, the remainder of the optical members 2 are disposed in the corresponding accommodation sections 115, followed by the second cycle of adhesive-dispensing and photocuring operations.

Figure 6:
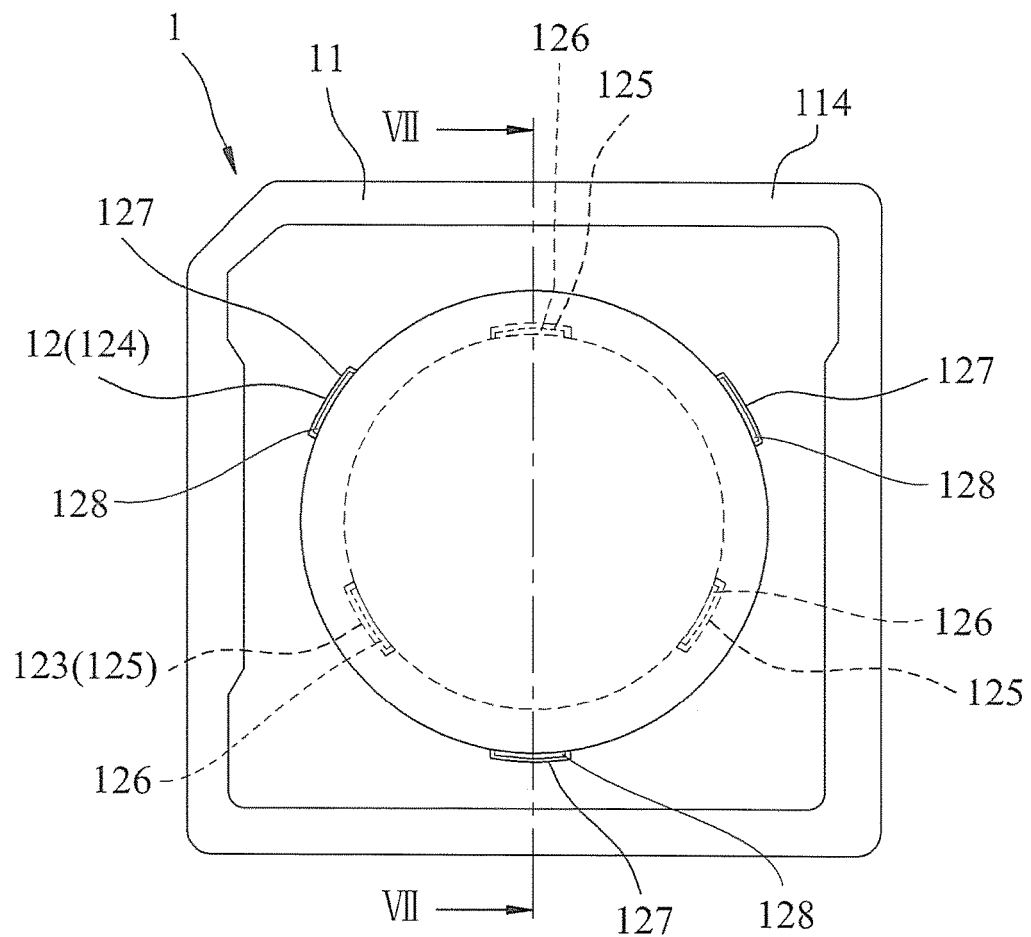
FIG. 6 is a top schematic view of the second embodiment of a lens assembly according to the disclosure.
Figure 7:
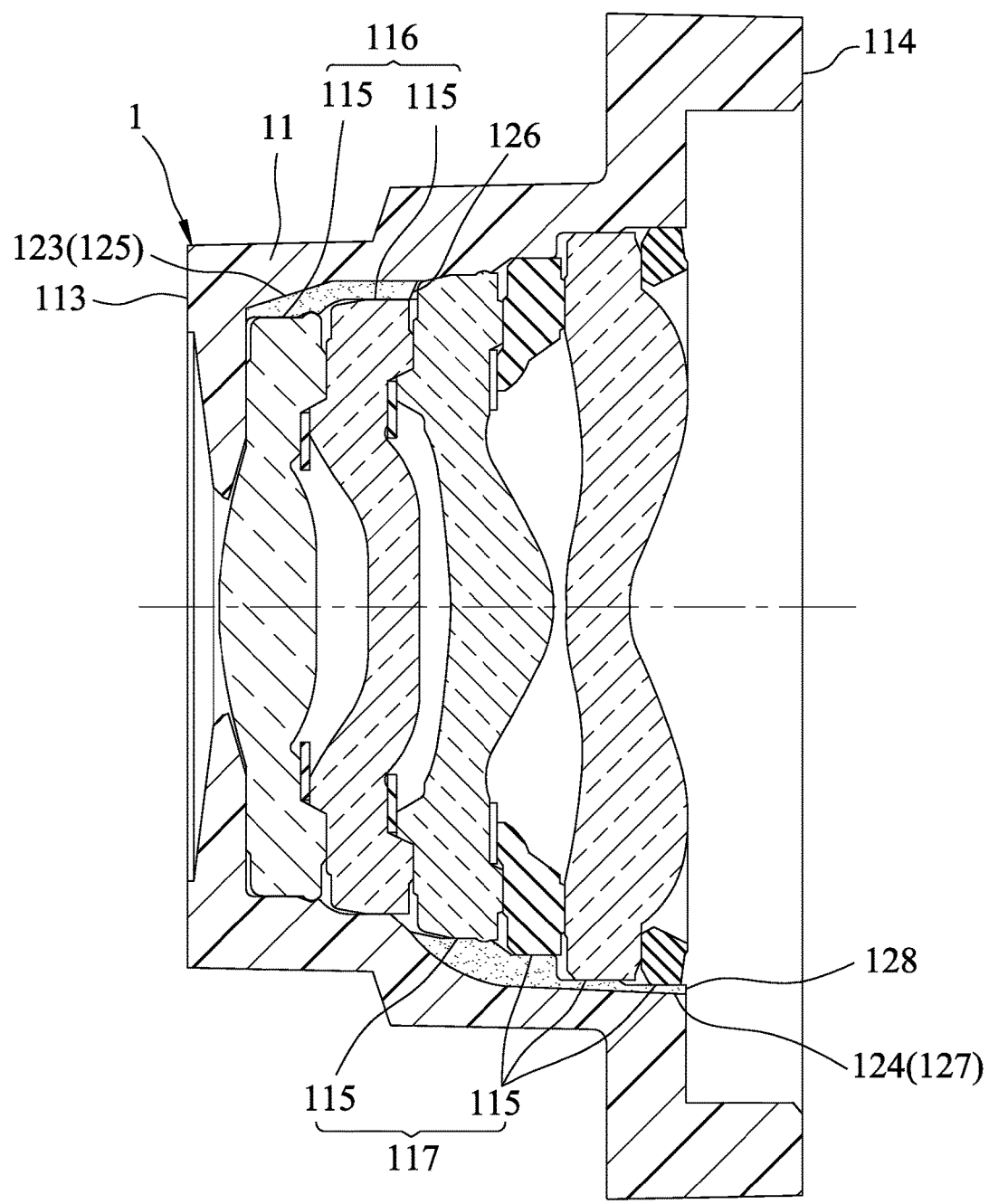
FIG. 7 is a sectional view taken along a line VII-VII shown in FIG. 6.

Referring to FIGS. 6 to 7, the second embodiment of a lens assembly according to the disclosure is similar to the first embodiment except for the structure of the lens barrel module 1.

In the second embodiment, the accommodation sections 115 defined by the peripheral wall 111 of the lens barrel unit 11 of the lens barrel module 1 are grouped into an object side-adjacent accommodation area 116 and an image side-adjacent accommodation area 117.

The flow path unit 12 includes an object side-adjacent subunit 123 and an image side-adjacent subunit 124. The object side-adjacent subunit 123 includes three object side-adjacent flow paths 125 that are spacedly and angularly arranged and that are in spatial communication with the object side-adjacent accommodation area 116. Each of the object side-adjacent flow paths 125 has an opening 126 proximate to the second end 114. The image side-adjacent subunit 124 includes three image side-adjacent flow paths 127 that are spacedly and angularly arranged and that are in spatial communication with the image side-adjacent accommodation area 117. The image side-adjacent flow paths 127 are alternated with and not in spatial communication with the object side-adjacent subunit 123. Each of the image side-adjacent flow paths 127 has an opening 128 proximate to the second end 114.

In such an arrangement, the second embodiment is able to achieve the same effect as the first embodiment.

Figure 8:
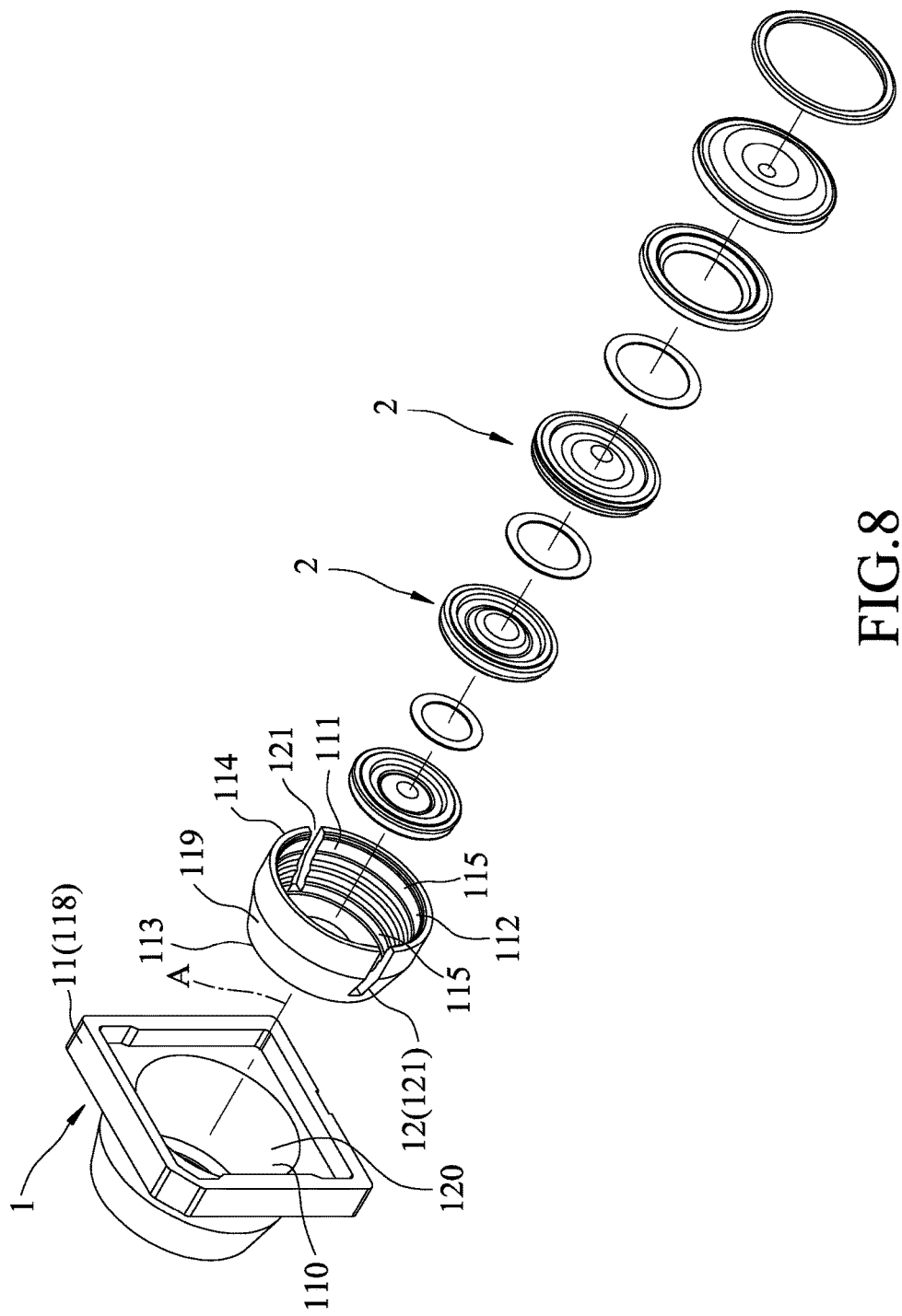
FIG. 8 is an exploded perspective view for illustrating the third embodiment of a lens assembly according to the disclosure.
Figure 9:
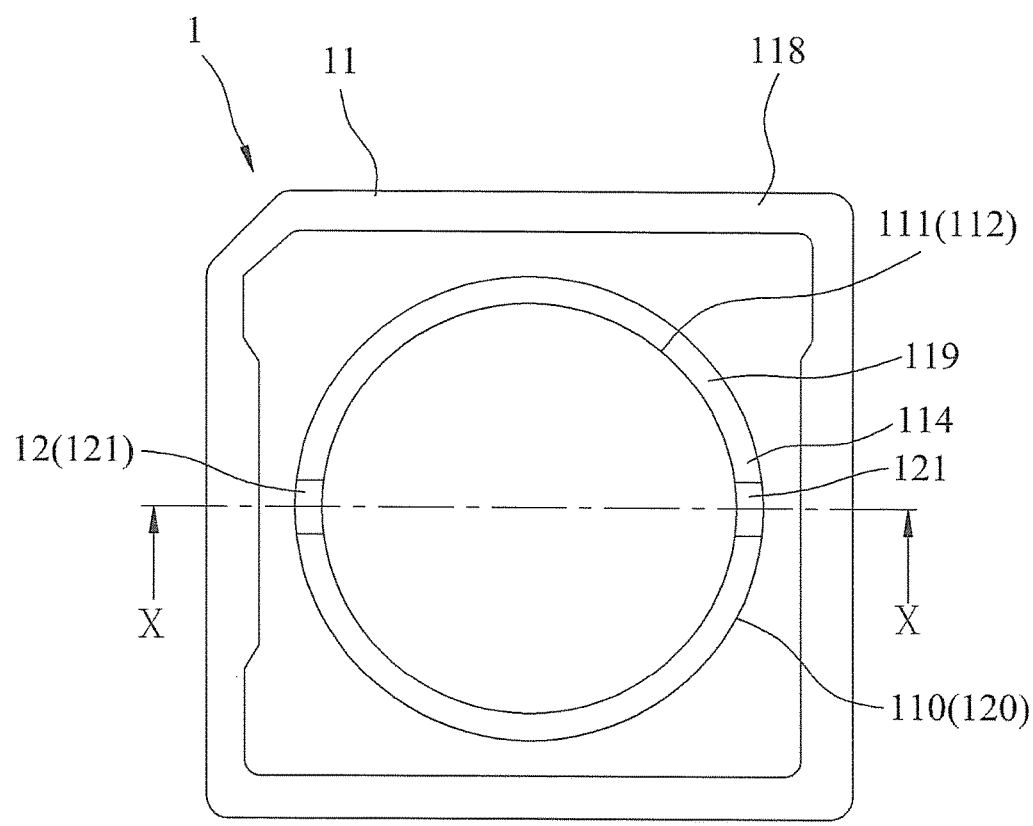
FIG. 9 is a top schematic view of the third embodiment.
Figure 10:
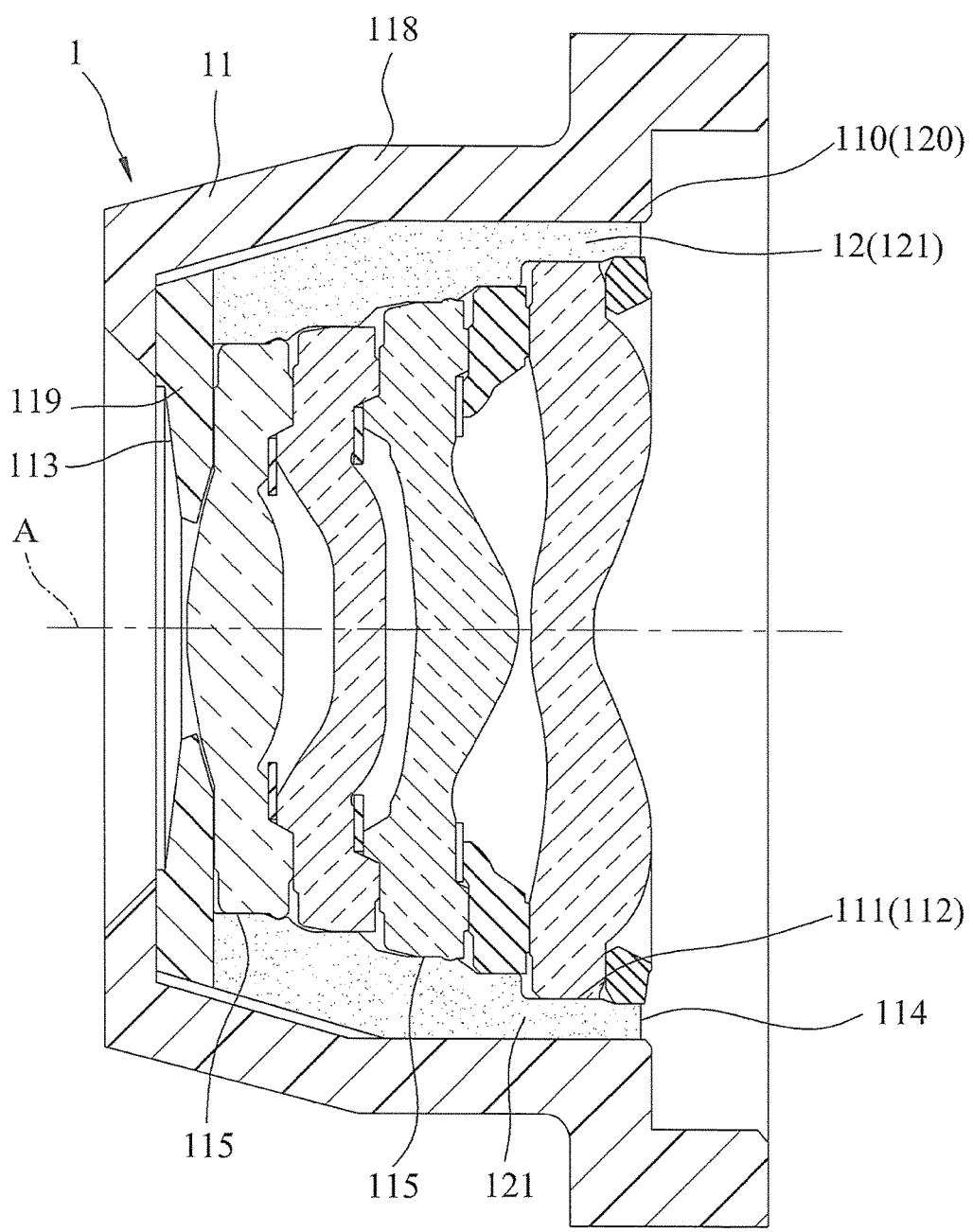
FIG. 10 is a sectional view taken along a line X-X shown in FIG. 9.

Referring to FIGS. 8 to 10, the third embodiment of a lens assembly according to this disclosure is similar to the first embodiment except for the structure of the lens barrel module 1.

In the third embodiment, the lens barrel unit 11 of the lens barrel module 1 includes an outer sleeve 118 and an inner sleeve 119. The outer sleeve 118 has a circumferential wall 110 that surrounds the axis (A) and defines a sleeve space 120. The inner sleeve 119 is disposed removably in the sleeve space 120 and includes the peripheral wall 111 that surrounds the axis (A), defines the accommodation space 112, and has the first and second ends 113, 114 and the accommodation sections 115. In this embodiment, the outer sleeve 118 and the inner sleeve 119 are exemplified by being secured to each other through an adhesive-dispensing and photocuring operation. However, other suitable securing techniques known in the relevant art are also applicable.

The flow path unit 12 includes a pair of flow paths 121, each of which is in spatial communication with the accommodation sections 115 and the sleeve space 120.

In this embodiment, the flow paths 121 of the flow path unit 12 are open flow paths. When the lens assembly is assembled, after the optical members 2 are disposed in the corresponding accommodation sections 115, the adhesive is dispensed to the flow paths 121, and the photocuring operation is performed with sufficient light irradiation from outside of the inner sleeve 119 for curing the adhesive to form the adhesive element 3. Thereafter, the inner sleeve 119 is disposed in and secured to the outer sleeve 118. Unlike the first and second embodiments wherein light primarily enters the accommodation sections 115 through the openings 122, 126, 128, the structural design of the open flow paths 121 enables the adhesive dispensed to the flow paths 121 to be evenly photocured.

In such a manner, the third embodiment achieves the same effect as or even better than the first embodiment.

In sum, through the structural design of the flow path unit 12 in spatial communication with the accommodation sections 115, assembling of the lens assembly according to this disclosure may involve only one cycle of adhesive-dispensing and photocuring operations of the adhesive element 3 after placement of all the optical members 2. The time required for assembling the lens assembly is greatly reduced and the assembling efficiency is enhanced.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lens barrel module adapted to receive a plurality of optical members of a lens assembly, comprising:
    a lens barrel unit that extends along an axis and that includes a peripheral wall surrounding the axis and having a first end which is adjacent to an object side of the lens assembly and a second end which is opposite to said first end and adjacent to an image side of the lens assembly, said peripheral wall defining an accommodation space that is configured as a series of accommodation sections for receiving the optical members; and
    a flow path unit that is formed in said lens barrel unit and that is in spatial communication with at least two of said accommodation sections,
    wherein said lens barrel unit includes an outer sleeve that has a circumferential wall surrounding the axis and defining a sleeve space, and an inner sleeve that is disposed removably in said sleeve space and that includes said peripheral wall which surrounds the axis, which defines said accommodation space configured as said accommodation sections and which has said first and second ends, said flow path unit being in spatial communication with said accommodation sections and said sleeve space.

2. The lens barrel module of claim 1, wherein said flow path unit has at least one openings proximate to said second end of said peripheral wall.

3. The lens barrel module of claim 1, wherein one of said accommodation sections that is most adjacent to said first end has a sectional dimension defined by said peripheral wall not greater than that of another of said accommodation sections that is most adjacent to said second end.

4. The lens barrel module of claim 3, wherein said accommodation sections are grouped into an object side-adjacent accommodation area and an image side-adjacent accommodation area, said flow path unit including an object side-adjacent subunit that is in spatial communication with said object side-adjacent accommodation area and that has an opening facing the image side, and an image side-adjacent subunit that is in spatial communication with said image side-adjacent accommodation area and not in spatial communication with said object side-adjacent subunit and that has an opening facing the image side.

5. The lens barrel module of claim 4, wherein said object side-adjacent subunit includes three object side-adjacent flow paths that are spacedly and angularly arranged, said image side-adjacent subunit including three image side-adjacent flow paths that are spacedly and angularly arranged and alternated with said object side-adjacent flow paths.

6. A lens assembly, comprising:
    a lens barrel module that includes a lens barrel unit and a flow path unit, said lens barrel unit extending along an axis and including a peripheral wall that surrounds the axis and that has a first end adjacent to an object side of the lens assembly and a second end opposite to said first end and adjacent to an image side of the lens assembly, said peripheral wall defining an accommodation space that is configured as a series of accommodation sections, said flow path unit being in spatial communication with at least two of said accommodation sections;
    a plurality of optical members that are disposed in said accommodation sections of said accommodation space; and
    an adhesive element filling said flow path unit so as to make said lens barrel module and said optical members bonded together,
    wherein said lens barrel unit includes an outer sleeve that has a first circumferential wall surrounding the axis and defining a sleeve space, and an inner sleeve that is disposed removably in said sleeve space and that includes said peripheral wall which surrounds the axis, which defines said accommodation space configured as said accommodation sections and which has said first and second ends, said flow path unit being in spatial communication with said accommodation sections and said sleeve space.

7. The lens assembly of claim 6, wherein said flow path unit has at least one openings proximate to said second end of said peripheral wall.

8. The lens assembly of claim 6, wherein said flow path unit includes a pair of flow paths, each of which is in spatial communication with said accommodation sections and said sleeve space.

* * * * *